June 6, 1950     K. M. TUOHY     2,510,438
CONTACT LENS
Filed Feb. 28, 1948

INVENTOR,
Kevin M. Tuohy
BY
Hazard & Miller
ATTORNEYS.

Patented June 6, 1950

2,510,438

UNITED STATES PATENT OFFICE 2,510,438

CONTACT LENS

Kevin M. Tuohy, Los Angeles, Calif., assignor to Solex Laboratories, Inc., Los Angeles, Calif., a corporation of California Application February 28, 1948, Serial No. 12,040

2 Claims. (Cl. 88—54)

This invention relates to a contact lens adapted to be applied to the human eye for the primary purpose of correcting deficient vision.

Heretofore contact lenses have been produced that have been made of either glass or synthetic resin plastics which have portions resting directly on the cornea of the eye with a supporting flange or border resting on the scleral portion of the eye or which have central portions arching over the cornea and which have flange or border portions designed to extend beyond the limbus of the eye. The optical correction has been ground on that portion of the contact lens disposed over the cornea and fluids compatible with the eye tissue have generally been interposed between the lens and the eye. Such contact lenses have had a number of objections which have, either collectively or individually, retarded their general use. Among these objections are (1) the time and skill required to properly fit the lenses to the eyes of the patient; (2) the lack of comfort which prevents such contact lenses from being worn continuously longer than only relatively short times; (3) the development of the appearance of rainbows or halos, particularly around bright light sources and the clouding of the vision after the lenses have been worn for a relatively short time; and (4) the necessity of determining and then using fluids with the contact lenses which are compatible with the eye tissues of the user.

I have ascertained that one important source of these objections is occasioned by the fact that the contact lenses heretofore devised universally engage the scleral portion of the eye so that the pressure of the flange or border portion of the contact lens on the scleral portion not only applies objectionable pressure to the nerves in the eye but retards the normal blood flow through the veins in the scleral position. The pressure on the nerves and the retarding of the normal blood flow is conducive to the development of irritation and is a principal reason for the appearance of the objectionable rainbows, halos and cloudiness. The contact lenses heretofore developed, even when removed for the purpose of resting the eye, do not bring about immediate relief on removal and, due to the fact that they cover such a wide expanses of the eye, they must be fitted with a relatively high degree of accuracy by one who is highly skilled in this type of work. With the use of contact lenses which extend beyond the limbus portion the eye is almost completely covered and with the fluid sealing off all possibility of air and natural eye fluids the eye soon becomes exhausted.

An object of the present invention is to provide an improved contact lens which is characterized by the fact that when properly fitted to the eye of the person for which it was designed its maximum dimensions will be less than the dimensions across the limbus at the edges of the cornea. In the preferred arrangement, the contact lens embodying the present invention is smaller in size than the iris but larger than the maximum pupil opening. This is particularly true when the lens and the iris are considered along the horizontal meridian. When considered on the vertical meridian the lens may exceed the iris slightly but still should be within the limbus. In this manner as the lens normally does not engage the sclera, the sclera is exposed to air and natural eye fluids and is not subjected to the objections arising from pressures applied thereto.

A further important characteristic of the improved lens resides in the fact that although it is in the nature of a concavo-convex section of transparent material largely conforming in shape and size to the cornea of a given eye, the inside or concave surface actually is slightly flatter or may be regarded as having a slightly greater radius of curvature than the cornea. In this manner the lens may actually contact the cornea near the center of the lens while the portions of the lens adjacent its margin are slightly spaced therefrom. This space affords an opportunity for the natural eye fluids to enter and relieves pressure on the cornea. Although blinking of the eyelids may displace the lens from over the cornea temporarily so that its edges may extend across the limbus and even onto the sclera, the minimum contact between the lens and the cornea occasioned by this relation of curvatures is such as to reduce the irritation, if any is present, to a minimum.

With the foregoing and other objects in view, which will be made manifest in the following detailed description and specifically pointed out in the appended claims, reference is had to the accompanying drawings for an illustrative embodiment of the invention, wherein:

Figure 1:
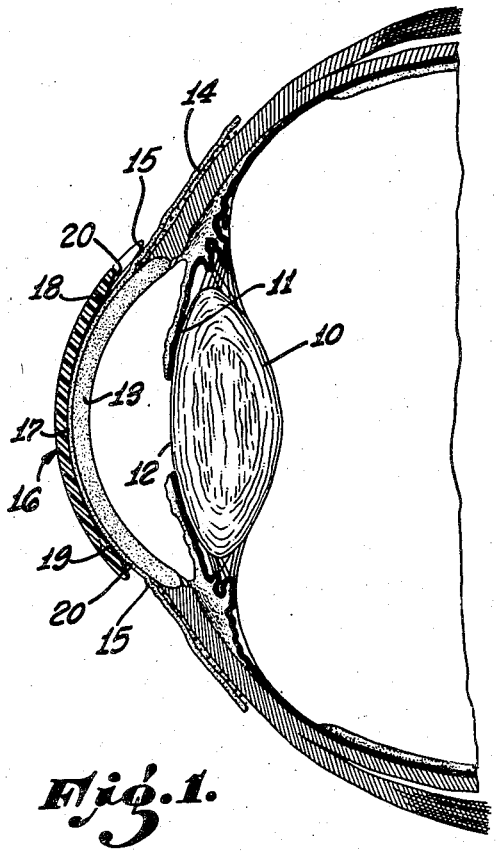
Figure 1 is a vertical section on an enlarged scale through the forward portion of a human eye illustrating a contact lens embodying the present invention in applied position thereon.
Figure 2:
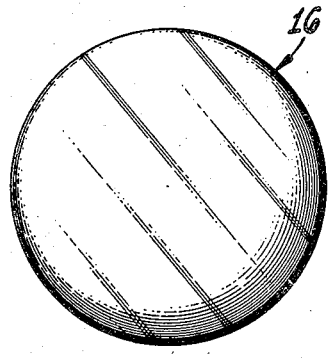
Figure 2 is a front view in elevation of the contact lens illustrated in Figure 1.
Figure 3:
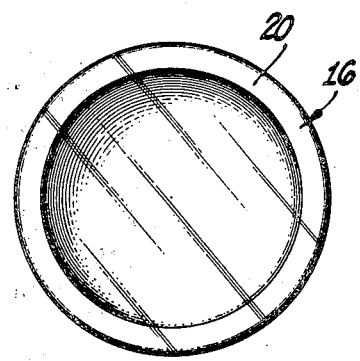
Figure 3 is a rear view in elevation of the same.

Referring to the accompanying drawings wherein similar reference characters designate similar parts throughout, in Fig. 1 the lens of the eye is indicated at 10 over which there is the iris 11 which defines the pupil 12. The cornea is generally indicated at 13 and the sclera generally indicated at 14. The limbus portion which defines the sclera from the cornea is indicated at 15.

The contact lens embodying the present invention consists of a concavo-convex section 16 of any suitable transparent or semi-transparent material. This material may be optical glass or, in conformity with conventional practice, it may be a synthetic resin plastic of the type now generally being employed in the manufacture of contact lenses. The material in the usual situation may be perfectly transparent but in some instances it may be slightly darkened or tinted either for glare-reducing purposes or to enhance or modify the natural color of the iris 11 in securing desired cosmetic effects.

This section will, of course, vary in size and shape to conform to the particular eye to which it is fitted but in embodying the present invention it possesses the following characteristics. The maximum dimension such as the diameter of the lens is less than the corresponding dimension of the iris so that the margins of the lens when in the normal applied position are within the iris 11. However, the lens is not so small that it will not completely cover the pupil 12 when the iris 11 is in its fully opened position. The lens may, therefore, be defined as to size as being within the limbus of the eye but beyond the maximum opening of the iris. Another characteristic of the lens is that it has a radius of curvature slightly greater than the radius of curvature of the cornea to which it is applied or, in other words, the lens is slightly flatter on its concave side than the convexity of the cornea. In this manner the major portion of the contact between the lens and the cornea will occur near the center of the cornea or in the neighborhood of the location indicated at 17, whereas at the top and bottom of the lens, as well as as the two sides there will be slight clearance spaces 18 and 19. I find its advisable to have a slight difference between the radius of curvature of the concave side of the lens and the convex surface of the cornea so as to reduce irritation. The clearance spaces 18 and 19, as well as the clearance spaces at the sides of the lens, enable the natural eye fluids to enter between the lens and the cornea which is, of course, desirable. The presence of this fluid in these clearance spaces probably contributes to the holding of the lens in place on the cornea such as by capillary action. The optical correction may be ground either on the interior or exterior surface of the lens 16 or both, and in some instances the optical correction ground on the interior surface of the lens is adequate to provide the clearance spaces 18 and 19. In other words, the lens blank may initially have an interial radius of curvature exactly conforming to the radius of curvature of the cornea but on grinding the optical correction on the interior of the lens its concave radius of curvature may be so altered thereby as to provide the clearance spaces which are of adequate size. These clearance spaces need not be great and, for example, if the radius of curvature of the cornea measures 7.8 millimeters the radius of curvature of the concave side of the lens need only be 7.9 or possibly 8.0 millimeters.

I find it advantageous in the usual lens to bevel the concave surface adjacent the margins, as indicated at 20. When the lens is in applied position on the eye the eyelid, in blinking or closing thereover, will tend to disturb the position of the lens on the cornea. Usually most of this disturbance is created by the upper eyelid which, on opening, may tend to lift the lens from the full line position shown in Fig. 1 to a dotted line position therein and, as illustrated in the dotted line position the lens may be temporarily shifted upwardly so that it has crossed over the limbus portion 15 and may even extend partially onto the sclera 14. This displacement of the lens is usually only temporary and subsequent blinking or closing of the eyelid will tend to restore the lens to its centralized position with relation to the cornea. As the limbus portion 15 usually protrudes slightly the internal bevel 20 facilitates the slipping of the lens thereover so that when displacement of the lens does take place it may occur without causing irritation. When the lens is returned to the cornea in the course of subsequent blinking, it tends to centralize itself thereon.

Any necessary correction may be ground on the surfaces of the lens and in some instances the correction required is such that the lens must be either relatively thick or have relatively thick margins. Where the lens is thick or has thick margins the external or convex surface may be beveled as indicated at 21 to facilitate the passing of the conjunctiva of the eyelids thereover. Both bevels 20 and 21 should be relatively small and should be confined to the distance between the maximum opening of the iris and the limbus portion 15 so that the user under no circumstances will look through a beveled portion of the lens.

Figure 4:
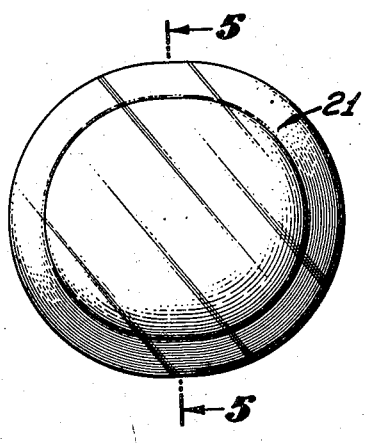
Figure 4 is a front view in elevation of a slightly modified form of construction.
Figure 5:
Figure 5 is a vertical section taken substantially upon the line 5—5 upon Figure 4.

In Fig. 4 a slightly modified form of construction is illustrated wherein the lens, instead of being circular in form, is slightly ovate or elliptical. The lens may be given any shape required to properly fit the size and shape of the cornea to which it is applied.

It will be noted from the above described construction that the improved contact lens is relatively simple. A feature of its construction resides in the fact that in its normal position shown in Fig. 1 no portion of the lens contacts the sclera and consequently the irritation generally produced when contact lenses are pressing against the sclera is entirely avoided. Furthermore, the prescribing of lenses of this character is greatly simplified. Whereas heretofore it has generally been necessary to form a mold of the eye to determine the size and shape of the cornea and the size and shape of the surrounding sclera, in the present construction the size and shape of the sclera becomes relatively immaterial. The prescription for the required correction can be determined in the usual manner and the corneal portion of the eye can then be measured both horizontally and vertically by any conventional measuring instrument used for this purpose. With the measurements of the cornea known both as to height, width and radius of curvature and the required correction known, a lens manufacturer can easily fill a prescription for contact lenses with reasonable assurance that the lens will fit the patient properly. In so doing his skill and judgment may be required in determining whether or not a lens blank having a larger internal radius of curvature than that of the cornea shall be used or whether the lens may have the same internal radius of curvature and the correction ground on the inside of the lens be relied upon to form these clearances. In the use of the improved lens it is unnecessary to try repeatedly and reject various solutions or fluids before wearing time can be gained inasmuch as no solution need be used at all with the present lens. However, in applying the lens embodying the present invention it is frequently advisable to moisten its surfaces so that at the time of initial application there will not be any discomforture particularly of the eyelids. No special fluid or solution is required for this purpose and ordinary water not harmful to the eye may be employed to moisten the lens. When the lens is worn its presence can rarely be detected. Even the bevels at the margins of the lens can rarely be detected due to the fact that they are within the iris portion, the edges of the lens particularly at the sides of the iris being backgrounded by the colored iris and to a large extent undiscernible and although the lens at the top and bottom of the iris projects or slides beyond the iris these portions are normally concealed by the upper and lower eyelids.

I find that lenses of this character can be worn over prolonged periods of time—periods of twelve and thirteen hours of continuous use being not unusual—without causing objectionable irritation and without causing cloudiness or rainbow and halo effects which are frequently produced with the usual contact lens in very much shorter periods of time.

I find it advisable to mark the lenses so as to be able to distinguish the lens for the right eye from the lens for the left eye and to indicate which side of the lens should be positioned uppermost and lowermost as the case may be. Such markings may be very small and when applied should be applied very close to the margin of the lens and if the lens is beveled they should be applied to a bevel.

Various changes may be made in the details of construction without departing from the spirit and scope of the invention as defined by the appended claims.

I claim:

1. A contact lens applicable to the human eye comprising a concavo-convex lens formed of light-transmitting material having a marginal size smaller than the limbus portion of the eye to which it is applicable but larger than the maximum iris opening, said lens having a radius of curvature on its concave side slightly greater than the radius of curvature of the cornea to which it is applied so that radially from the center of the lens there will be a small but gradually increasing clearance for the entry of natural eye fluids between the lens and the cornea, said lens being ground to correct for visual deficiency.

2. A contact lens applicable to the human eye comprising a concavo-convex lens formed of light-transmitting material having a marginal size smaller than the limbus portion of the eye to which it is applicable but larger than the maximum iris opening, said lens having a radius of curvature on its concave side slightly greater than the radius of curvature of the cornea to which it is applied so that radially from the center of the lens there will be a small but gradually increasing clearance for the entry of natural eye fluids between the lens and the cornea, said lens being ground to correct for visual deficiency and having a bevel at its marginal edges on the concave side thereof.

KEVIN M. TUOHY.

REFERENCES CITED

The following references are of record in the file of this patent:

UNITED STATES PATENTS

| Number | Name | Date |
| --- | --- | --- |
| 722,059 | Volle | Mar. 3, 1903 |
| 2,000,768 | Linke | May 7, 1937 |

FOREIGN PATENTS

| Number | Country | Date |
| --- | --- | --- |
| 805,592 | France | Aug. 31, 1936 |

OTHER REFERENCES

The New Hamblin-Dallos Contact Lens, (publication), page 143 of "The Optician," April 1, 1938.

Obrig (Text) "Contact Lenses," 1942, publication by the Chilton Co., Philadelphia, Pa., pages 370 to 373 inclusive and pages 129 and 130.

"Contact Lenses," (publication) by E. Freeman O. D., published in The Optometric Weekly, February 28, 1946, pages 271 and 276.

"The Design of Contact Lenses" by Vincent Hill, published in "The Optician," May 23, 1947, pages 335, 336, 337 and 341.

The Optician (pub.) "High Precision Contact Lenses," Sept. 5, 1947, published by the Hatton Press Ltd., 72 to 78 Fleet Street, London, England EC4, page IX.